April 5, 1960

B. D. WEDDLE 2,931,604

CHRISTMAS TREE HOLDER

Filed June 13, 1958

INVENTOR.
BILLY D. WEDDLE

BY

McMorrow, Berman + Davidson
ATTORNEYS

United States Patent Office 2,931,604
Patented Apr. 5, 1960

2,931,604

CHRISTMAS TREE HOLDER

Billy D. Weddle, Nashville, Ind.

Application June 13, 1958, Serial No. 741,876

3 Claims. (Cl. 248—44)

This invention relates to supporting devices, and more particularly to a Christmas tree support adapted to hold a Christmas tree in an upright position, and being particularly adapted to support a live Christmas tree whose roots are covered with a ball of earth.

A main object of the invention is to provide a novel and improved Christmas tree support which is simple in construction, which is easy to set up for use, and which is adjustable to accommodate a wide range of sizes of Christmas trees, and which is especially adapted to receive a live Christmas tree whose roots are surrounded by a ball of earth.

A further object of the invention is to provide an improved Christmas tree support which is relatively inexpensive to manufacture, which is durable in construction, which is neat in appearance, and which is compact in size, the support device being especially adapted to receive a live tree whose roots are surrounded by a ball of earth and to adequately maintain the tree roots moistened so as to prevent injury to the tree while it is being employed for the holiday season.

Further objects and advantages of the invention will become apparent from the following description and claims, and from the accompanying drawings, wherein:

Figure 1:
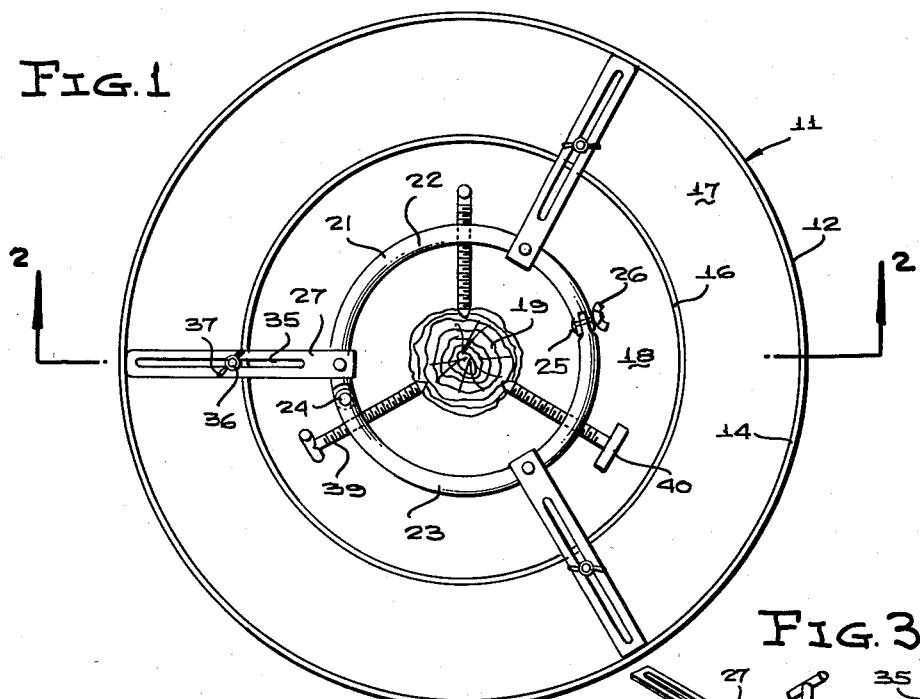
Figure 1 is a horizontal cross sectional view taken through a Christmas tree mounted in an improved tree support according to the present invention, the tree support being shown in top plan view.
Figure 2:
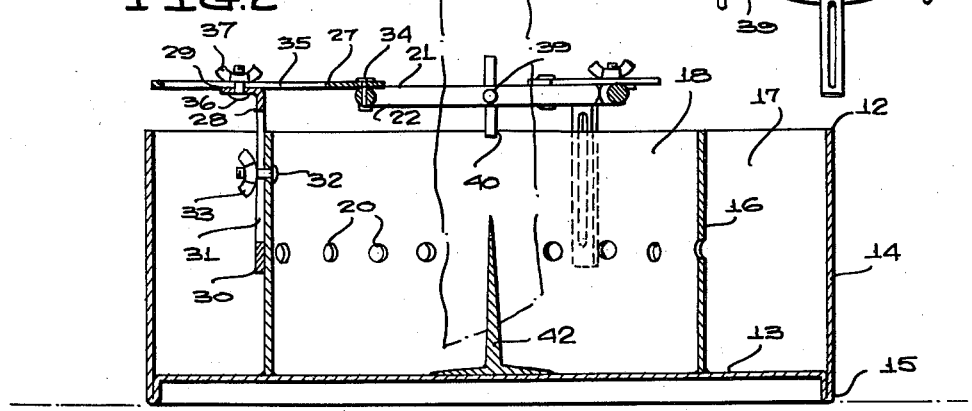
Figure 2 is a vertical cross sectional view taken on the line 2—2 of Figure 1.

Referring to the drawings, and more particularly to Figures 1 and 2, 11 generally designates a Christmas tree support according to this invention, the support comprising a generally cylindrical base container 12 having the circular bottom wall 13 and the upstanding cylindrical outer wall 14, the bottom of the container being provided with a depending peripheral rib or flange 15 serving to maintain the bottom wall 13 of the container elevated a short distance from the floor.

Concentrically secured in the base container 12 is a perforated upstanding, generally cylindrical inner partition wall 16, said partition wall being substantially smaller in radius than the outer cylindrical wall 14, whereby to define an annular space 17 between the inner wall 16 and the outer wall 14, said space being adapted to receive suitable ballast material, such as sand, or the like, and a suitable amount of water, whereby moisture from the ballast material 17 and the water provided therewith may enter the inner receptacle, shown at 18 and moisten the roots of a Christmas tree 19 supported in the device.

The cylindrical innerwall 16 may be provided with any desired number of perforations, for example, may be formed with the spaced perforations 20 located approximately midway between the top and bottom planes of the cylindrical partition wall 16, as shown in Figure 2.

Designated at 21 is a supporting ring comprising the semicircular rigid rod elements 22 and 23 hingedly connected together at 24 and detachably secured together at their outer ends in any suitable manner, as by a bolt 25 extending through the outer ends of the segments 22 and 23 and provided with a wing nut 26 thereon.

A plurality of radially outwardly extending flat bar members 27 are secured to the ring 21, for example, three equally spaced, outwardly extending flat radial bar segments 27, as shown in Figure 1, said bar segments overlying the top rim of the cylindrical partition member 16 and being secured to respective vertically adjustable supporting bar elements 28 provided on the upstanding cylindrical partition wall 16. Thus, the bar members 28 are generally L-shaped, as shown in Figure 2, and have the horizontally extending top flanges 29 and the slotted vertical flanges 30, the slots herein being shown at 31. Fastening bolts 32 are provided in the upper portions of the cylindrical partition wall 16, said bolts extending through vertical slots 31 and being provided with wing nuts 33, whereby the bar members 28 may be clamped in adjusted vertical position on the cylindrical partition wall 16.

The horizontal upper bar segments 27 are pivoted to the ring 21 by the respective connecting rivets 34, as shown in Figure 2, and the bar members 27 are provided with longitudinal slots 35. Vertical fastening bolts 36 extend through the top flange elements 29 of the members 28 and through the slots 35, being provided with wing nuts 37, whereby the members 27 may be adjustably secured to the horizontal flange elements 29 by tightening the wing nuts 37.

A plurality of horizontal, radially inwardly extending clamping screws 39 are threadedly engaged through the ring member 21, being spaced apart by equal angles, as shown in Figure 1. The clamping screws 39 are provided with transverse heads 40 of substantial size, whereby said screws may be manually rotated. The inner ends of the screws are adapted to clampingly engage with the trunk of the Christmas tree 19, as shown in Figure 1, whereby to securely fasten the tree in a desired position substantially centrally within the ring 21. However, if the tree is irregular in cross sectional shape or is irregularly inclined, the screws 38 may be accordingly adjusted to provide clamping engagement with the tree trunk, after the ring 21 has been suitably adjusted to locate the three trunk as nearly centrally as possible therein.

Rigidly secured to the center of the bottom wall 13 is the upwardly projecting spike member 42 adapted to penetrate into and engage the bottom end of a tree trunk 19, when an ordinary severed Christmas tree is used in the holder. Otherwise, if a tree is used which has its roots surrounded by a ball of earth, the spike member 42 will penetrate into the ball of earth and stabilize the bottom of the tree so that the tree can be firmly secured in an upright position by means of the ring 21 and the clamping screws 39.

Figure 3:
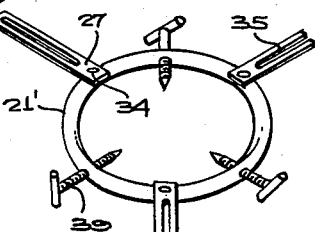
Figure 3 is a perspective view showing a modified form of inner supporting ring which may be employed in a Christmas tree support according to this invention.

Figure 3 illustrates a modified form of supporting ring, shown at 21', which may be employed in place of the segmented ring 21. The ring 21' is completely solid and is engaged on the tree from below when a severed tree is to be mounted in the holder. Otherwise, ring member 21' is used in the same manner as the ring member 21, being provided with the inwardly radially extending clamping screws 39 and with the pivoted horizontal, longitudinally slotted bar members 27.

As will be readily apparent, to mount a large tree in the support, the ring segments 22 and 23 of the form of the invention illustrated in Figures 1 and 2 are first separated, so that they may be placed around the tree trunk above the ball of earth, the ball of earth being engaged in the inner receptacle 18 and being stabilized by engagement with the upstanding spike 42. The ring segments 22 and 23 are then suitably centered and fastened together by the bolt 25 and wing nut 26, the ring being then fastened on the bracket bars 28 and adjusted so that the tree trunk is as nearly as possible centered within the ring. The ring is then fastened in position by tightening the wing nuts 37, after which the tree is clamped by tightening the clamping screws 39.

Moisture from the ballast material in the annular space 17 will seep through the apertures 20 into the inner compartment 18 and maintain the tree roots in a live condition, thus preventing the tree from being severely damaged by its use through the holiday season as a Christmas tree.

While certain specific embodiments of an improved Christmas tree support has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A Christmas tree support comprising a base container of substantial horizontal base area and having a base provided with an upstanding outer peripheral wall, a perforated vertical upstanding inner partition wall secured on said base and defining a central receptacle therewith to receive the lower end of the trunk of a Christmas tree and defining with said base and said peripheral wall an outer receptacle to receive ballast material, a supporting ring, means adjustably securing said ring to said inner partition wall in a position such that the ring overlies a portion of said central receptacle, said means comprising a plurality of spaced vertical bracket members engaging said inner partition wall, said bracket members having vertical slots, fastening members extending through said slots and adjustably securing the bracket members to said partition wall, slotted horizontal arms secured to said ring and engaged on said bracket members, fastening means extending through the slots of the horizontal arms and adjustably securing said horizontal arms to the bracket members, and a plurality of inwardly projecting horizontal abutment members adjustably mounted on said supporting ring and adapted to supportingly engage the trunk of the Christmas tree.

2. A Christmas tree support comprising a base container of substantial horizontal base area and having a base provided with an upstanding outer peripheral wall, a perforated substantially cylindrical vertical upstanding inner partition wall secured on said base and defining a central receptacle therewith to receive the lower end of the trunk of a Christmas tree and defining with said base and said peripheral wall an outer receptacle to receive ballast material, a supporting ring, means adjustably securing said ring to said inner partition wall in a position such that the ring overlies a portion of said central receptacle, said means comprising a plurality of spaced vertical bracket members engaging said inner partition wall, said bracket members having vertical slots, fastening members extending through said slots and adjustably securing the bracket members to said partition wall, slotted horizontal arms secured to said ring and engaged on said bracket members, fastening means extending through the slots of the horizontal arms and adjustably securing said horizontal arms to the bracket members, and a plurality of inwardly projecting horizontal abutment members threadedly engaged through said supporting ring and adapted to supportingly engage the trunk the Christmas tree.

3. A Christmas tree support comprising a generally cylindrical base container of substantial horizontal base area and having a base provided with an upstanding outer peripheral wall, a perforated generally cylindrical vertical upstanding inner partition wall concentrically secured on said base and defining a central receptacle therewith to receive the lower end of the trunk of a Christmas tree and defining with said base and said peripheral wall an annular outer receptacle to receive ballast material, a supporting ring, means adjustably securing said ring to said inner partition wall in a position such that the ring overlies a portion of said central receptacle, said means comprising a plurality of spaced vertical bracket members engaging said inner partition wall, said bracket members having vertical slots, fastening means extending through said slots and adjustably securing the bracket members to said partition wall, slotted horizontal arms secured to said ring and engaged on said bracket members, fastening means extending through the slots of the horizontal arms and adjustably securing said horizontal arms to the bracket members, a plurality of inwardly projecting radial horizontal clamping screws threadedly engaged through said supporting ring and adapted to supportingly engage the trunk of a Christmas tree, and an upstanding spike member centrally secured on said base.

References Cited in the file of this patent
UNITED STATES PATENTS

| 1,394,386 | Wilske | Oct. 18, 1921 |

FOREIGN PATENTS

| 119,473 | Sweden | Aug. 19, 1947 |
| 206,207 | Switzerland | Jan. 16, 1940 |